United States Patent
Jeong

(10) Patent No.: US 10,254,947 B2
(45) Date of Patent: Apr. 9, 2019

(54) SMART DEVICE CAPABLE OF MULTI-TASKING CONTROL, AND CONTROL METHOD THEREFOR

(71) Applicant: Han Uk Jeong, Seoul (KR)

(72) Inventor: Han Uk Jeong, Seoul (KR)

( * ) Notice: Subject to any disclaimer, the term of this patent is extended or adjusted under 35 U.S.C. 154(b) by 0 days.

(21) Appl. No.: 14/767,587

(22) PCT Filed: Sep. 12, 2014

(86) PCT No.: PCT/KR2014/008511
§ 371 (c)(1),
(2) Date: Aug. 13, 2015

(87) PCT Pub. No.: WO2015/037934
PCT Pub. Date: Mar. 19, 2015

(65) Prior Publication Data
US 2016/0239174 A1 Aug. 18, 2016

(30) Foreign Application Priority Data
Sep. 13, 2013 (KR) .................. 10-2013-0110721

(51) Int. Cl.
*G06F 3/0488* (2013.01)
*G06F 3/14* (2006.01)
(Continued)

(52) U.S. Cl.
CPC ............. *G06F 3/0488* (2013.01); *G06F 3/048* (2013.01); *G06F 3/0482* (2013.01); *G06F 3/14* (2013.01); *G06F 9/46* (2013.01); *G06F 9/4881* (2013.01)

(58) Field of Classification Search
CPC ......... G06F 2203/04804; G06F 3/0481; G06F 3/0488; G06F 3/0482; G06F 3/048; G06F 3/14; G06F 9/46; G06F 9/4881
See application file for complete search history.

(56) References Cited

U.S. PATENT DOCUMENTS

2007/0229517 A1* 10/2007 May .................. G06Q 10/109
345/501
2008/0163082 A1* 7/2008 Rytivaara ............ G06F 1/1626
715/762
(Continued)

FOREIGN PATENT DOCUMENTS

KR 10-2010-0010296 2/2010
KR 10-2011-0107059 9/2011
(Continued)

OTHER PUBLICATIONS

English Translation of 10-2011-0107059.
(Continued)

*Primary Examiner* — Ajay M Bhatia
*Assistant Examiner* — Mong-Shune Chung
(74) *Attorney, Agent, or Firm* — Antonio Ha & U.S. Patent, LLC

(57) ABSTRACT

Disclosed are a smart device capable of multi-tasking control, capable of controlling a multi-tasking program while a main program screen is viewed, and a control method therefor. The smart device capable of multi-tasking control and the control method therefor can control a second program without being disturbed by the use of a first application and have the advantages of easily controlling a second application due to a wide input range since a user uses the entire screen, and enabling the user to control two applications, as necessary, since the overlay state of a first screen can be changed using only a simple input signal.

12 Claims, 6 Drawing Sheets

(51) Int. Cl.
*G06F 9/46* (2006.01)
*G06F 3/048* (2013.01)
*G06F 3/0482* (2013.01)
*G06F 9/48* (2006.01)

(56) References Cited

U.S. PATENT DOCUMENTS

2012/0218200 A1* 8/2012 Glazer ................ G06F 3/04883
                                                                       345/173
2014/0184530 A1* 7/2014 Hyun .................... G06F 1/1626
                                                                       345/173

FOREIGN PATENT DOCUMENTS

KR    10-2011-0113844    10/2011
KR    10-2012-0092037     8/2012

OTHER PUBLICATIONS

English Abstract of 10-2012-0092037.
English Translation of 10-2011-0113844.
English Translation of 10-2010-0010296.

* cited by examiner

SMART DEVICE CAPABLE OF MULTI-TASKING CONTROL, AND CONTROL METHOD THEREFOR

TECHNICAL FIELD

The present invention relates to smart devices and control methods thereof, and more specifically, to multitasking controllable smart devices and control methods thereof that enable the control of a multitasking application while viewing a main application screen.

BACKGROUND ART

Recent electronic devices are evolving to smart devices that may use wireless communication using a mobile communication network or Wi-Fi, have various applications installed or allow additional applications to be installed thereon.

The integration of mobile communication terminals and smart devices and technical development allow for provision of various additional functions of e.g., a camera, a movie player, a television (TV), or navigation, as well as simply transmitting voice information or text messages.

The smart devices may have various applications installed thereon, offering the user application-based services. Further, a smart device user may access a server retaining smart device applications anytime to download and install his desired application.

Meanwhile, the smart device enables a multitasking function that simultaneously runs two or more programs to operate the programs. For example, the smart device may operate a music player program to play music and operate an Internet surfing program to listen to the music while doing Internet surfing. Further, while the smart device may operate a navigation program to be directed for a route, the smart device operates the music player program to play music. Further, when receiving a call while Internet surfing or navigation proceeds, the smart device may enable the call to be on the line while Internet surfing or navigation goes on.

However, in order to control the program running on the background when the multitasking function is executed, the main program running screen should be changed to the screen of the program that is running on the background.

Further, in the case where the main program is a navigation program, route direction cannot be served while the background program is being controlled, and a few steps should be taken to control the background program, causing user inconvenience.

SUMMARY

[Objects]

Accordingly, an object of the present invention is to address the problems of the prior art and to provide a multitask-controllable smart device and method for controlling the same, which, when a first application and a second application are simultaneously running, may overlay the second application control screen on the screen where the first application is running, split the second application control screen into a first screen and a second screen, and change the first screen to be transparent so that the second application may be controlled while the first application running screen is viewed.

However, the present invention is not limited to the foregoing objects, and other objects will be apparent to one of ordinary skill in the art from the following detailed description.

[Configuration]

To achieve the above objects, to the present invention, a small device that may perform multitasking control may comprise an input unit receiving information according, to a user's key or menu manipulation; a controller running an application according to the information received through the input unit; and a display unit receiving a control signal from the controller to display on a screen. When a second application is run while a first application is running, the controller may display a second application control screen to be overlaid on a first application running screen, split the second application control screen into a first screen and a second screen, change the first screen to be transparent, display state information on the second application on the second screen, and receive an input signal through the first screen or the second screen to control the second application.

Meanwhile, the second screen may be displayed on a portion of the first application running screen or on an edge portion of the first application running screen, and an operation state may be displayed in a color or in a light flickering form. The input signal may be input through a touch or a sliding signal.

Further, when receiving an input signal determined by a predetermined rule through the second application control screen, the controller may remove the first screen or overlay the first screen back. Further, when receiving a signal determined as per a predetermined rule, the first screen and the second screen both may be removed, and when a predetermined time elapses or when there is no input signal for a predetermined time, the first screen and the second screen may be displayed back.

To achieve the above objects, on the other hand, according to the present invention, a method for controlling a smart device may comprise receiving an input signal from an input unit to display a second application control screen to be overlaid on a first application running screen, splitting the second application control screen into a first screen and a second screen, changing the first screen to be transparent and allowing the second screen to display state information on the second application, receiving an input signal through the first screen or the second screen, and performing control according to the input signal.

In this case, the second screen may be rendered to be displayed on a portion of the first application miming screen. Further, the second screen may be displayed on an edge portion of the first application running screen, and the state information may be displayed in a color or in a light flickering form. Further, the input signal may be a touch or a sliding signal.

Further, performing the control may allow for, when receiving a signal determined by a predetermined rule from the second application control screen, removing the first screen or both the first screen and the second screen, and when a predetermined tune elapses or when there is no input signal for a predetermined time, redisplaying the first screen and the second screen.

[Effects]

Thus, according to the present invention, the first application, which is intended to operate as a main application, and the second application operating together with the first application on the background by multitasking may be simultaneously executed, with the second application control screen overlaid on the first application running screen, wherein the second application control screen may be split, into the first screen and the second screen, wherein the first screen may be turned to be transparent, and the second screen may display an operation state of the second application, so that the user may be aware of the operation state of the two applications and may control the second application while viewing the first application through the screen.

In other words, while using, the first application, the second application may be controlled even without screen change, so that the second program may be controlled without interfering with the use of the first application.

Meanwhile, since a control signal of the second application may be input through the first screen, the user may use the overall screen, thus allowing, an increased input range and resultant ease to control the second application.

Further, since the overlaid state of the first screen may be released, when the first application needs to be controlled as necessary, the overlaid state of the first screen may be changed by a simple input signal. Thus, the user may control the two applications as necessary.

Other effects of the present invention will be apparent to one of ordinary skill in the art from the following detailed description.

DESCRIPTION OF EXEMPLARY
EMBODIMENTS

Various changes may be made to the present invention, and the present invention may come with a diversity of embodiments. Some embodiments of the present invention are shown and described in connection with the drawings. However, it should be appreciated that the present invention is not limited to the embodiments, and all changes and/or equivalents or replacements thereto also belong to the scope of the present invention.

The terms "first" and "second" may be used to describe various components, but the components should not be limited by the terms. The terms are used only to distinguish one component from another. For example, a first component may be denoted a second component, and vice versa without departing from the scope of the present disclosure.

The terms as used herein are provided merely to describe some embodiments thereof, but not to limit the present disclosure. It is to be understood that the singular forms "a," "an," and "the" include plural references unless the context clearly dictates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which the embodiments of the present disclosure belong.

It will be further understood that terms, such as those defined in commonly used dictionaries, should be interpreted as having a meaning that is consistent with their meaning in the context of to the relevant art and will not be interpreted in an idealized or overly formal sense unless expressly so defined herein.

Figure 1:
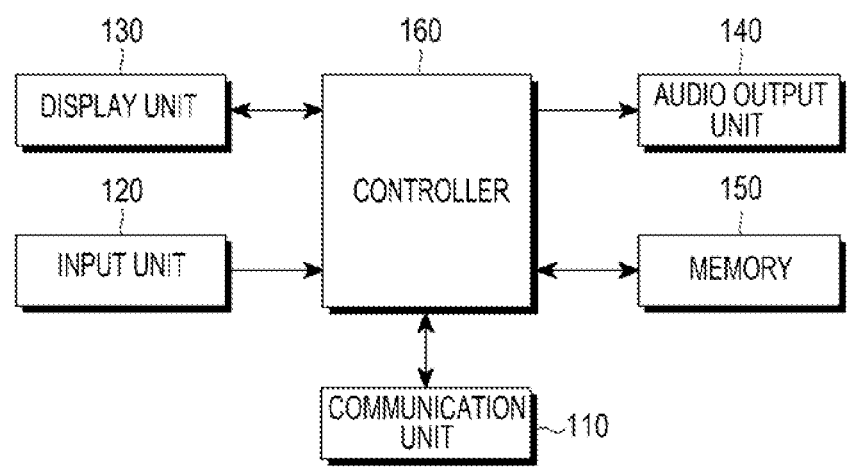
FIG. 1 is a block diagram illustrating a multitask-controllable smart device according to an embodiment of the present invention.

FIG. 1 is a block diagram illustrating a multitask-controllable smart device according to an embodiment of the present invention.

As used herein, the term "smart device" is a device that may receive a mobile communication service using a mobile communication network or receive a communication service through a wireless Internet and that may allow a program or application to be freely installed or used therein, and the term "smart device" may collectively mean a device that may receive a mobile communication service using a mobile communication network, such as, e.g., a mobile phone, a smartphone, tablet personal computer (PC), a laptop computer, or a personal digital assistant (PDA).

Referring to FIG. 1, the smart device for receiving a call while an application is running, according to an embodiment of the present invention, may include as communication unit 110, an input unit 120, a display unit 130, an audio output unit 140, a memory 150, and a controller 160.

The communication unit 110 may transmit an outgoing call to an opposite party's smart device or may receive an incoming call from the opposite party's smart device. The communication unit 110 may communicate voices according to a call connection.

The input unit 120 may receive information by a user's key or menu manipulation. For example, the input unit 120 may enable an input by allowing the display unit to be directly touched using a touchscreen. The user may input whether to execute various applications for additional functions through the input unit 120.

In this case, the applications may e.g., a navigation function, a digital multimedia broadcasting (OMB) function, a game function, and an Internet search function. Such additional functions may be functions that may be installed upon manufacture of the smart device or may be downloaded and installed while in use.

The display unit 130 may receive a signal from the controller 160 to display video data related to the running application.

The audio output unit 140 may output voices or audios provided from various running applications for additional functions.

The memory 150 may store applications for additional functions a contacts list, images or videos.

The controller 160 may control the operation of the smart device. The controller 160 may perform control to execute various applications for additional functions, to receive audio or video data from the various applications, and to output the received audio or video data to the display unit 130 and the audio output unit 140.

In particular, when a second application is run while a first application is running, the controller 160 may display a screen indicating state information of the second application on a portion of a screen where the first application is running without affecting the first application running screen. For example, the controller 160 may perform control to split the second application control screen into a first screen and a second screen, with the second application control screen overlaid on the first application running screen and to change the first screen to be transparent while the second screen displays operation state information of the second application. In this case, the controller 160 may input a control signal through the first screen or the second screen and may receive the control signal to control the second application. The input signal may be a count of touch or a sliding pattern signal.

As the second application, various applications, such as a music player application or an application that may receive an incoming call or may control a call function, may be used.

In this case, the second screen is preferably displayed on a portion of the first application running screen. Further, the second screen may be displayed on an edge portion of the first application running screen, and in this case, an operating state may be displayed in color or in a light flickering form.

Meanwhile, the controller, when receiving a predetermined signal following a predetermined rule through the first screen or the second screen, may remove the first screen so that the first application running screen may be touched, enabling the control of the first application. For example, when receiving a predetermined signal under a predetermined rule, the controller may remove the first screen to enable the control of the first application and enable the second application to be controlled in the second screen. In this case, as a method for regenerating the first screen, the first screen may show up again when no input is made for a predetermined time or the first screen may be overlaid back through an input through the second screen.

As another example, when receiving a predetermined signal under a predetermined rule, the controller may remove both the first screen and second screen to enable the control of the first application, and when a predetermined time elapses or when there is no input signal for controlling the first application for a predetermined time, the first screen and the second screen may be overlaid back on the first application running screen.

Meanwhile, the controller 160 may control the second application by receiving an input signal according to a touch on the first or second screen or an input signal according to a direction in which a touch is slid.

For example, when the second application is run while the first application is running, the second application may be rendered to be controlled while viewing the first application running screen. When the second application is run while the first application is running, the second application control screen that is split into the first screen and the second screen is overlaid on the first application running screen. In this case, the first screen appears to be transparent, and the second screen displays state information of the second application. Since the first screen appears to be transparent. While the second application control screen is overlaid thereon, even when the control of a touch or slide is executed through the first screen, control on the second application is executed. In other words, although the first application running screen appears to be touched on the user's position, the control of the second application may be executed because the second application control screen is substantially overlaid on the first screen.

Meanwhile, the second application control screen should be removed to control the first application. For example, there may be used the scheme of removing the first screen alone or the overall second application control screen.

First, the scheme of removing the first screen alone is described. The controller, upon input of as touch or sliding signal set to remove the screen, removes the first screen and overlays the second screen as it is. In this case, the user may control the first application by touching the first application running screen. Meanwhile, the first screen may be overlaid back by inputting a touch or sliding signal to the second screen. Further, control may be performed so that, when a predetermined time elapses or when there is no signal input for a predetermined time, the first screen is overlaid back.

On the other hand, the scheme of removing the entire second application control screen is described. The controller, upon input of a touch or sliding signal set to remove the screen, removes the second application control screen for a predetermined time. In this case, the second application is in the state of being operated on the background. Since the second application control screen to that had been overlaid on the first application running screen was removed, the user may control the first application by touching, the first application running screen. The controller may sense a moment that the first application running screen is touched, and a predetermined time after a last touch signal is generated, may overlay the second application control screen back on the first application running screen to input a control signal through the first screen or second screen. Further, a predetermined time after the second application control screen is removed, the controller may enable the second application control screen to be automatically overlaid.

Meanwhile, the second screen is formed to cover only a portion of the screen where the first application running, so that the second application running information may be displayed in the screen. Further, the second screen may be displayed to surround an edge of the first application running screen, and in this case, the second application running information may be shown in a color or in a light flickering form.

Figure 2:
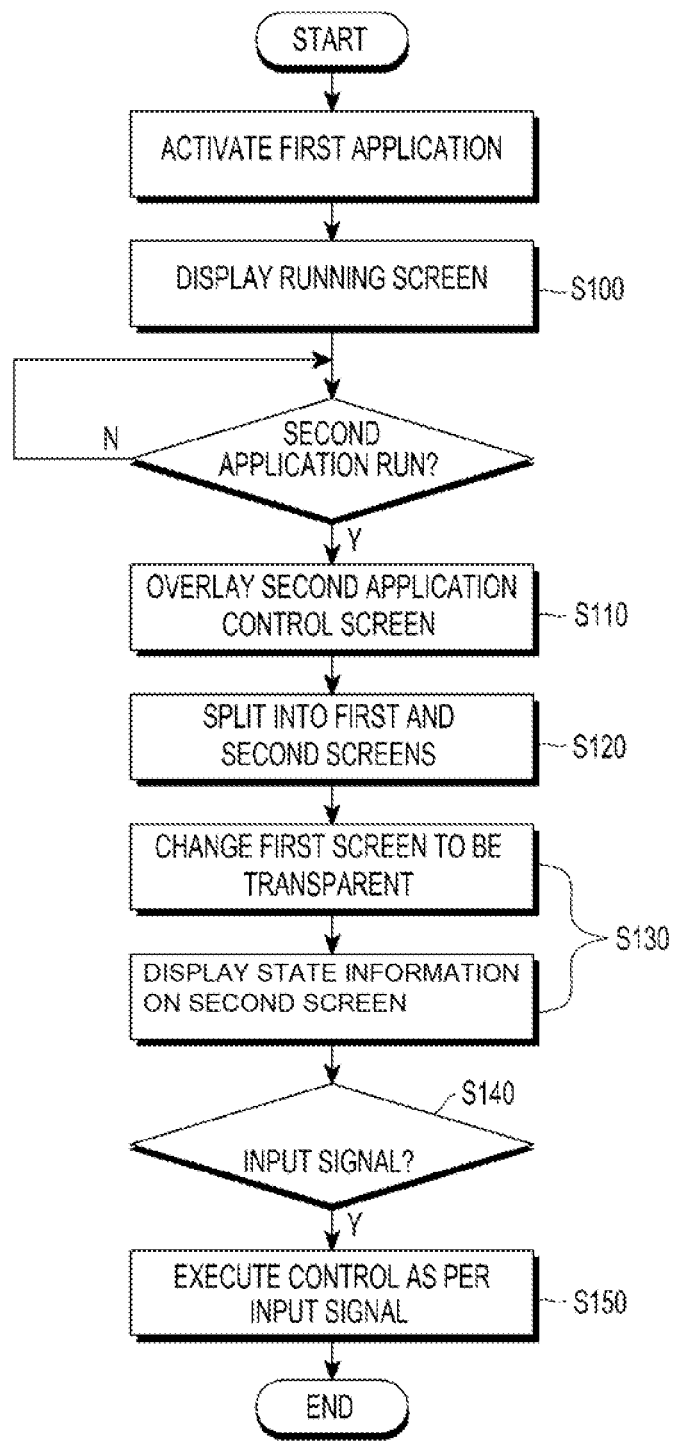
FIG. 2 is a flowchart illustrating a method for controlling a multitask-controllable smart device according to an embodiment of the present invention.

FIG. 2 is a flowchart illustrating a method for controlling a multitask-controllable smart device according to an embodiment of the present invention.

According to the present invention there is provided a control method in which, when a first application and a second application are simultaneously run in a multitasking manner by receiving information according to a user's key or menu manipulation, the second application may be controlled while the running screen of the first application is viewed. Further, according to the control method, when another program is run, like when an incoming call is received, while the first application is running, the other program may be controlled while the first application running screen is viewed.

A detailed description in connection with FIG. 2 is given. The present invention may include the step S110 of receiving an input signal from an input unit to display a second application control screen to be overlaid on a first application running screen, the step S120 of splitting the second application control screen into a first screen and to second screen, the step S130 of changing the first screen to be transparent and displaying state information on the second application on the second screen, the step S140 of receiving an input signal through the first screen or the second screen, and the step S150 of performing control according to the input signal.

The step S110 is the step of displaying the second application control screen to be overlaid on the running screen of the first application operating as a main application when the input signal is received front the input unit so that the first application and the second application are run in a multitasking way. For example, when the first application is a navigation program, and the second application is a music player program, the user may be directed for a route when the running screen of the navigation program, which is the first application, continues to be displayed. In this case, when the music player program, which is the second application, is executed in a multitasking manner to simultaneously play music, the screen where the second application may be controlled may be overlaid on the first application running screen, so that the music play by the second application may be controlled.

The step S120 is a step in which the second application control screen is split into the first screen and the second screen, so that, when the second application control screen is overlaid on the first application running screen, the first application running screen may be viewed, and state information on the second application may be displayed. In this case, the first application running screen may be viewed by making the first screen transparent in a subsequent step.

The step S130 is the step of performing control so that the first screen is rendered transparent, and the second screen displays the operation state of the second application. As described above, changing the first screen to be transparent allows the user to view the running screen of the first screen even when the second application running screen is overlaid on the first application running screen.

Figure 3:
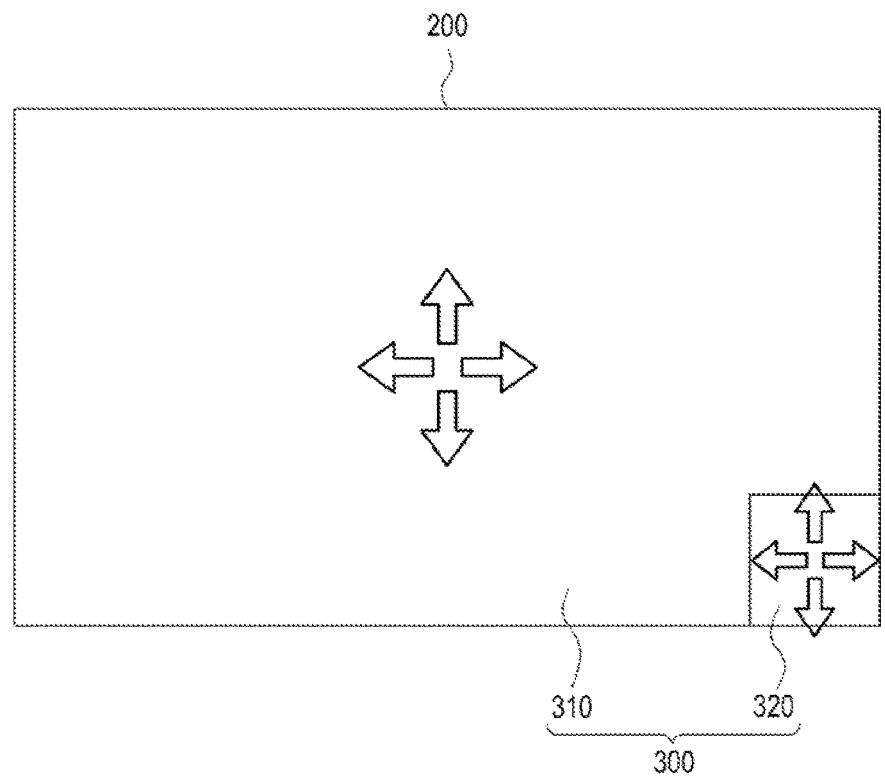
FIG. 3 is a view illustrating a state of control through a first screen and a second screen in a multi task-controllable smart device according to an embodiment of the present invention.
Figure 4:
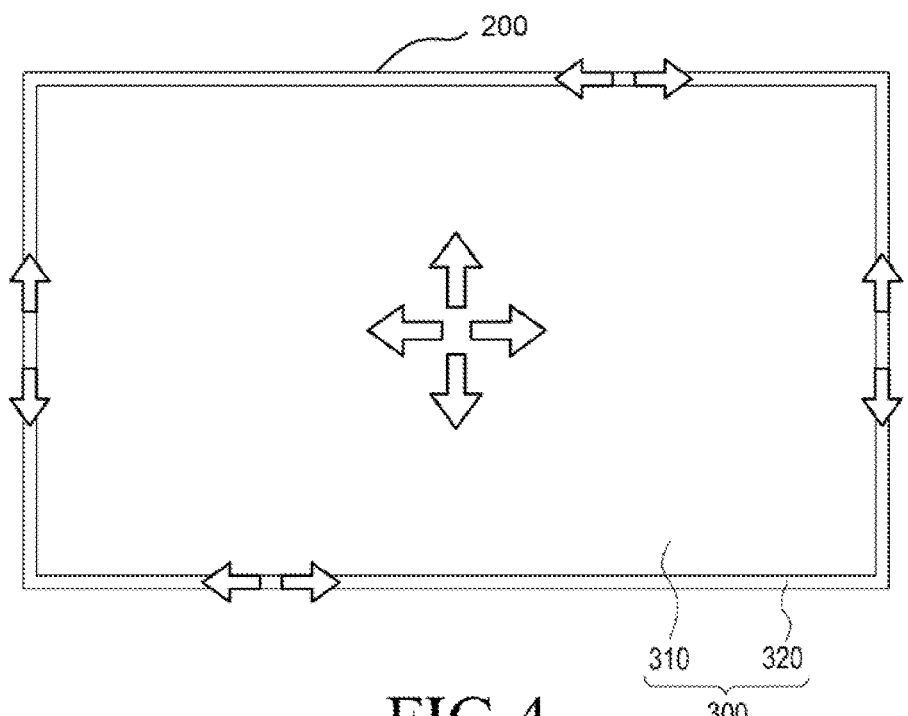
FIG. 4 is a view illustrating a state of control through a first screen and a second screen in a multitask-controllable smart device according to another embodiment of the present invention.
Figure 5:
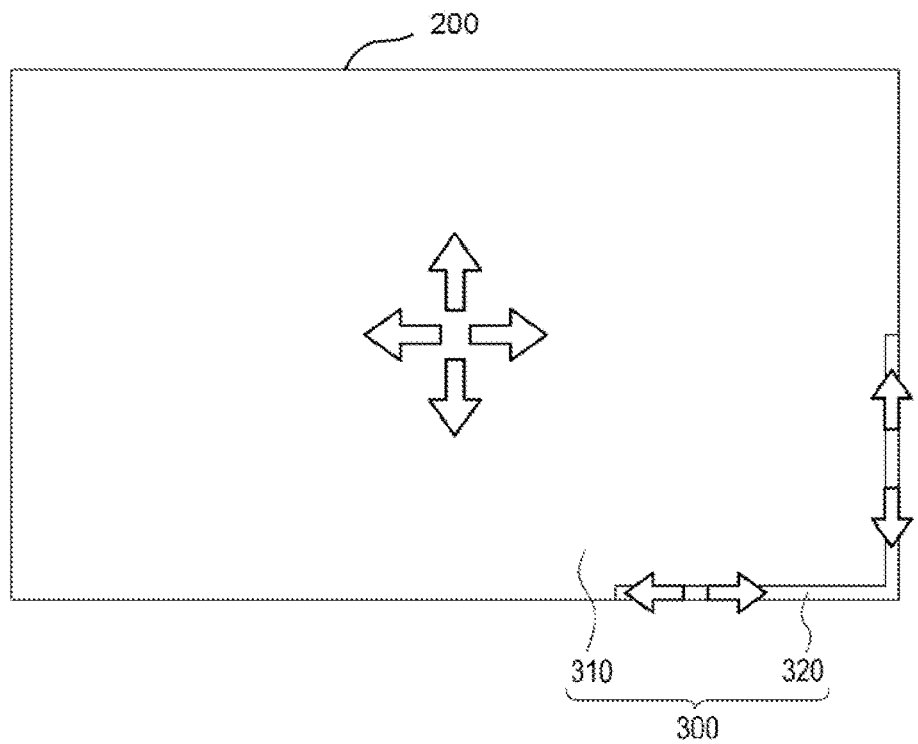
FIG. 5 is a view illustrating a state of control through a first screen and a second screen in a multitask-controllable smart device according to a variation to the embodiment of FIG. 4.

For example, as shown in FIG. 3, the second screen may be split to be displayed on a portion of the first application running screen, so that the first application running screen may be displayed to the maximum. As another example, as shown in FIG. 4, the second screen may be split to be displayed on an edge portion of the first application running screen, so that the first application running screen may be displayed substantially on the overall screen, and the operation state displayed on the second screen on the edge portion may be shown in a way of changing colors or flickering. As still another example, as shown in FIG. 5, the second screen may be split to be displayed only an edge portion of the first application running screen, so that the first application running screen may be displayed on a majority of the screen and the state information on the second application may be displayed through the second screen on a portion of the screen. In this case, the state information displayed on the second screen may be displayed in a manner that colors change or light flickers.

The step S140 is the step of receiving an input signal through the first screen or the second screen. In this step, an input signal for controlling the second application is received. The input signal may be a touch or a sliding signal. For example, as shown in FIGS. 3 to 5, a control signal may be input through touching and sliding on the first screen or second screen. In this case, when the input signal is input through the first screen, the control signal is transmitted to the second application while presenting a sense of touching the first application running screen. Meanwhile, a signal for controlling the second application may be input through the second screen.

The step S150 is the step of enabling the second application to be controlled according to the input signal input in step S140. In this case, upon receiving an input signal having a predetermined rule to remove the second application control screen, the second application control screen is removed. In this case, the scheme of removing the first screen alone or the scheme of removing the overall second application control screen for a predetermined time may be put to use. When receiving the input signal determined as per the predetermined rule while controlling the second application according to the input signal input through the first screen or second screen, the first screen of the second application control screen overlaid may be removed to enable the control of the first application, and when a predetermined time elapses or when an input signal determined as per a predetermined rule is input through the second screen, the first screen may be overlaid back. Further, when receiving an input signal determined as per a predetermined rule, the first screen and the second screen both may be removed, and when a predetermined time elapses or when there is no input signal for a predetermined time, the first screen and the second screen may be displayed back.

As described above, when in use with the first screen removed, the second application may be controlled through the second screen, and the first application may be controlled through the remaining portion, so that the two applications may be simultaneously controlled on one screen.

Now described in detail are operations and effects of the present invention through application screens to which embodiments of the present invention actually apply.

FIG. 3 is a view illustrating a state of control through a first screen and a second screen in multitask-controllable smart device according to an embodiment of the present invention. FIG. 4 is a view illustrating a state of control through a first screen and a second screen in a multitask-controllable smart device, according to another embodiment of the present invention. FIG. 5 is a view illustrating a state of control through a first screen and a second screen in a multitask-controllable smart device according to a variation to the embodiment of FIG. 4.

As shown in FIG. 3, the second application control screen 300 may be displayed overlaid on the first application running screen 200, and the second application control screen 300 may be split into the first screen 310 and the second screen 320.

The second screen 320 is displayed on a portion of the first application running screen 200. Further, the remainder except the second screen 320 may be displayed as the first screen 310, and the first screen 310 may be displayed transparent, so that the first application running screen 200 may be viewed through the first screen 310.

Meanwhile, as shown in FIG. 4, the second screen 320 is shown in form to surround an edge of the first application running screen 200. This case benefits in that the portion disturbed in the first application running screen 200 is reduced. Further, as shown in FIG. 5, the second screen 320 may be rendered to be displayed only a portion of the edge of the first application running screen 200.

Further, as shown in FIGS. 3 to 5, a control signal obtained by sliding in a direction marked with an arrow or a control signal obtained by touching may be input through the first screen 310 or the second screen 320.

Meanwhile, the second application control screen 300 should be removed to control the first application. To that end, when an input signal having a predetermined rule comes in, the second application control screen 300 may be removed.

In this case, a choice may be made between the scheme of removing only the first screen 310 from the second application control screen 300 and the se ne of removing the entire second application control screen 300 for a predetermined time. In other words, when receiving an input signal following a predetermined rule while the second application is in control, only the first screen 310 of the second application control screen 300 overlaid may be removed so that the first application may be controlled through a space of the first screen 310. Meanwhile, when a predetermined time elapses or when a signal for overlaying the first screen 310 is input through the second screen 320, the first screen 310 may be overlaid back.

Further, when receiving an input signal determined as per a predetermined rule, the first screen and the second screen both may be removed, and when a predetermined time elapses or when there is no input signal for a predetermined time, the first screen and the second screen may be displayed back.

Now described in detail are a multitask control-enabled smart device and control method thereof in connection with embodiments of the present invention.

First Embodiment

Figure 6:
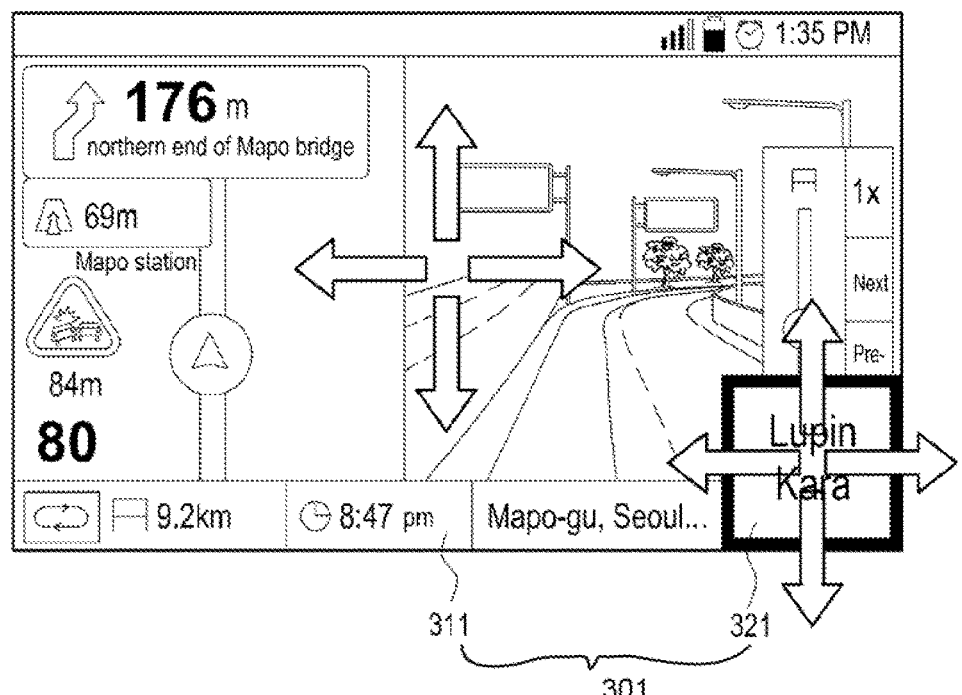
FIG. 6 is a view illustrating a screen of a state in which a music player application is running while a navigation s miming according to a first embodiment of the present invention.

FIG. 6 is a view illustrating a screen of a state in which a music player application is running while a navigation is running according to a first embodiment of the present invention. In this case, the arrow shown in FIG. 6 is an example of a control area where control may be performed and a direction of sliding and the arrow might not be shown in the actual navigation screen.

In this case, as the first application, various applications, such as an Internet browser, an e-book reader, or an image viewer, as well as the navigation, may be run, and as the second application, a music player application may be run, for example.

Referring, to FIG. 6, when the user runs the navigation according to the inputted information and then runs the music player application, a music play control screen 301 where the music player application may be controlled is overlaid on the navigation running screen. In this case, the music play control screen 301 is split into the first screen 311 taking up a majority of the entire screen and the second screen 321 occupying a portion of the entire screen. In this case, the first screen 311 may be displayed to be transparent so that navigation running screen may be viewed. Music play suite information may be displayed on the second screen 321. Various methods may be used to display the music play state information.

Figure 8:
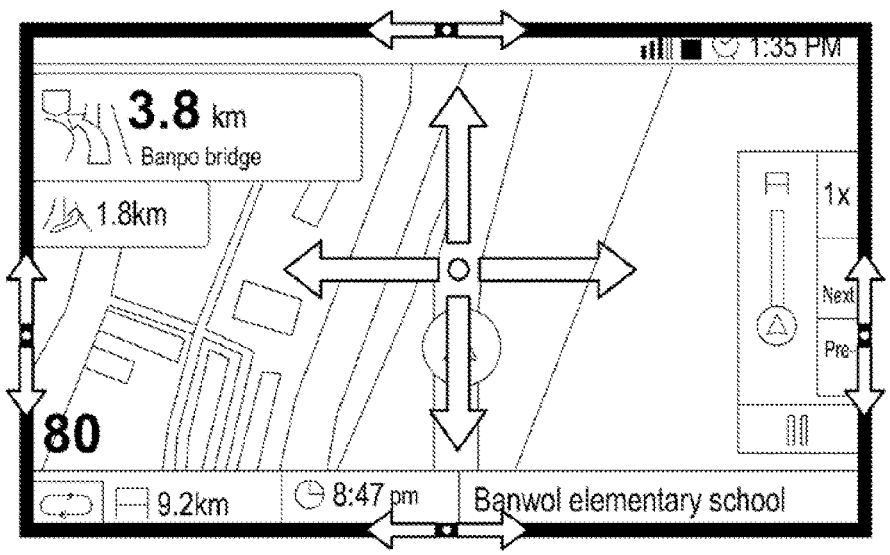
FIG. 8 is a view illustrating a screen of a state in which an overall edge is in use, which is an exemplary variation to the second screen according to the present invention.

Meanwhile, as shown in FIG. 8, the second screen 321 may be rendered to be positioned in a bar shape on an edge portion of the screen. A control signal may be input through the bar-shaped second screen 321.

In other words, the bar-shaped second screen may be displayed on the edge portion of the navigation running screen and may be set to have different colors between when music is played and when the music play is paused. For example, as shown in the drawings, when no music play goes on, the bar may be displayed in red, and when music is played, the bar may be displayed in green.

Figure 9:
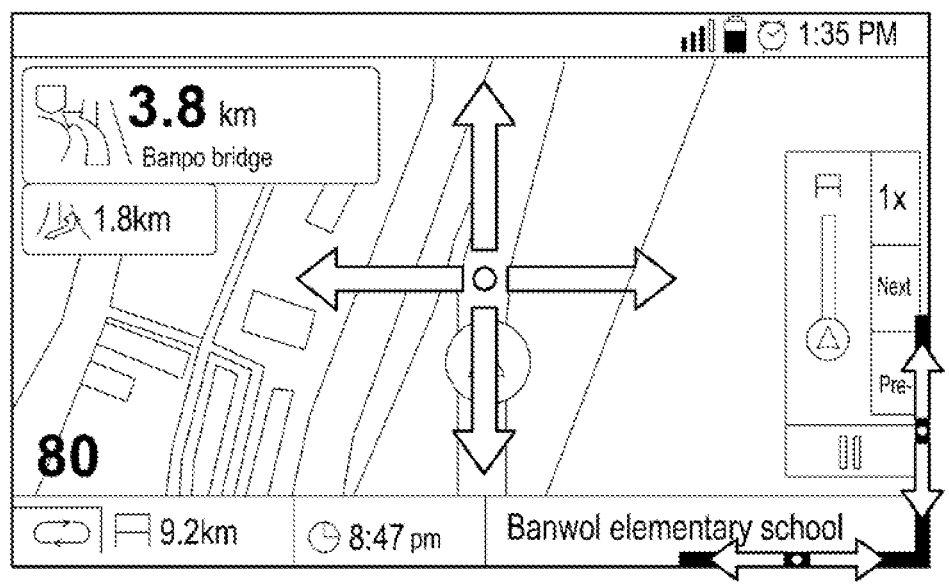
FIG. 9 is a view illustrating a screen of a state in which only a portion of an overall edge is in use, which is an exemplary variation to the second screen according to the present invention.

Further, as shown in FIG. 9, the bar-shaped second screen may be displayed to show up on a partial edge portion, but not on the entire edge. Further, the thickness of the bar may be adjusted to provide function control fitting the user.

Meanwhile, the bar shape might not provide a sufficient space to display music play is information. Thus, upon input of a control signal to enable information to be displayed, music play information may be rendered to be displayed on the first screen for a predetermined time.

Meanwhile, the user may control the music player application by inputting a control signal to the first screen 311 where the navigation running screen is viewed or the second screen 321 where the music play state information is displayed.

Since the first screen 311 is overlaid on the navigation running screen while appearing to be transparent, while the user views the navigation running screen 201, the user's actual touch on the screen enables the control signal to control the music player application. The user may perform control on the music player application by a touch or touch-and-slide.

Meanwhile, when intending to control the navigation, a predetermined control signal may be input through the first screen 311 or the second screen 321 to remove the first screen 311, so that the navigation may be controlled. Thereafter, when a predetermined control signal is input through the second screen with the first screen 311 removed or when a predetermined time elapses, the first screen 311 is regenerated, enabling the control of the music player application through the entire screen.

As another example control scheme, a predetermined control signal may be input through the first screen 311 or the second screen 321 to remove both the first screen 311 and the second screen 321 for a predetermined time, so that the navigation may be controlled. Thereafter, when a predetermined time elapses or when there is no touch signal for a predetermined time, the first screen 311 and the second screen 321 may be overlaid back, enabling the control of the music player application.

As described above, since the entire screen is put to use to control the music player application, the user using the navigation may easily control the music player program.

Second Embodiment

Figure 7:
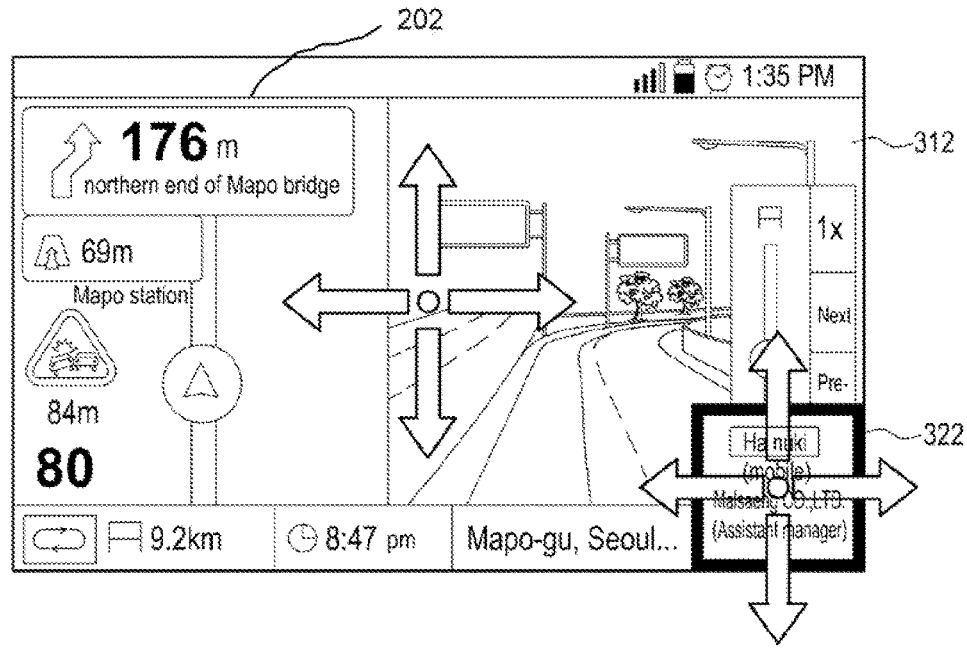
FIG. 7 is a view illustrating a screen of a state in which an incoming call is received while a navigation is running according to a second embodiment of the present invention.

FIG. 7 is a view illustrating a screen of a state in which an incoming call is received while a navigation is running according to a second embodiment of the present invention. In this case, the arrow shown FIG. 7 is an example of a control area where control may be performed and a direction of sliding and the arrow might not be shown in the actual navigation screen.

Referring to FIG. 7, the user runs the navigation according to the information inputted, and when an incoming call is received, a call function control screen is overlaid on the screen where the navigation is running. In this case, the call function control screen may be split into the first screen 312 occupying a majority of the entire screen and the second screen 322 occupying a portion of the entire screen, so that the first screen 312 may be displayed to be transparent to allow the first application running screen 202 to be viewed and incoming call reception information may be displayed on the second screen 322. In this case, various methods may be used to display information by the reception of the incoming call on the second screen 322.

In other words, when the incoming call is received while the navigation is running, the second screen 322 showing a call connection state may be displayed to be overlaid in a range not to affect the navigation screen, and the first screen may be displayed to be transparent, overlaid on the entire screen, so that the navigation running screen may be viewed.

Meanwhile, the second screen 322 may be displayed in a bar shape, and the bar-shaped second screen may be displayed on an edge portion of the navigation running screen. The second screen 322 may be set to have different colors between when the incoming call is received and when the incoming call is connected to distinguish therebetween. For example, when the incoming call is received, the bar may be displayed in red, and when incoming call is connected, the bar may be displayed in green to represent that the call is on the line. Further, while the incoming call is received, the bar may be displayed to flicker in at least one or more colors.

As shown in FIG. 8, the bar may be formed to surround the edge of the entire screen, and as shown in FIG. 9, the bar may be formed to use only a portion of the edge.

A call function may be controlled by sliding an edge of the second screen forming the edge in an upper or lower direction or in a left or right direction. Further, when the bar is formed to surround the overall screen, the color change may be performed in the same manner as when only a portion of the edge is formed. Further, the thickness of the bar may be adjusted to provide call function control fitting the user.

When the second screen is shaped as a bar as described above, it might not have an enough space to display call connection state information. Accordingly, when an incoming call is received, call connection state information may be displayed on the first screen for a predetermined time, and when the call is connected or rejected, the call connection state information may be removed.

As described above, when the incoming call is received, a call function may be controlled through the first screen or the second screen. For example, when the user touches or slides on the first screen or second screen while an incoming call is being received, the call is connected. When the call is connected, information indicating that call is in progress is displayed on the second screen. For example, the color of the second screen may be changed to indicate that the call is in progress.

Further, the call function may be controlled using the first screen or the second screen while the incoming call is being received or while the call is connected. For example, when the call reception window is slid while the incoming call is being received, a reception reject message may be sent out.

The above-described methods may be combined in various ways. In other words, as control rule different from the call connection controlling method may apply to reject the incoming call connection. When the incoming call is not connected by the above-described control, control for rejecting the reception is performed. For example, when the incoming call connection is rejected, a preset text message may be transmitted to the opposite party's smart device that has sent the incoming call. That is, the smart device may create a text message saying "Now I cannot take call" and may send the text message to the opposite party's smart device.

Meanwhile, call-related control may be performed in a way to slide the first or second screen while the call is connected. For example, upon receiving a signal obtained by sliding the call reception window in a left or right direction, with the call reception window touched, while in the call connected state, control may be performed to switch to speaker phone mode or a normal mode to allow a phone talk to proceed in the normal mode or the speaker phone mode. Further, upon receiving a signal obtained by sliding the call reception window in an upper or lower direction, with the first or second screen touched, control may be performed to activate a call recording function so that a call may be recorded.

Meanwhile, when intending to control navigation, input of a predetermined control signal may remove the first screen 311, so that the navigation may be controlled. Further, input of a predetermined control signal through the second screen with the first screen removed may regenerate the first screen, allowing a call function to be controlled through the entire screen. Further, when a predetermined time elapses, the first screen may be automatically generated, so that the second application may be controlled through the first screen or the second screen.

As another example control scheme, a predetermined control signal may be input through the first screen or the second screen to remove both the first screen and the second screen for a predetermined time so that the navigation may be controlled. Thereafter, when a predetermined time elapses or when there is no touch signal for a predetermined time, the first screen 311 and the second screen 321 may be overlaid back, enabling the reception of an incoming call and the control of a call function.

As described above, since the entire screen is put to use to control a call function, the user using the navigation may easily control the call function.

Meanwhile, the above-described embodiments of the present invention may be created in a program executable on a computer and may be implemented in a general-purpose digital computer operating the program using computer-readable recording medium. The computer-readable recording medium includes a storage medium, such as a magnetic storage medium (e.g., a ROM, a floppy disc, or a hard disc) or an optical reading medium (e.g., a CD-ROM or a DVD).

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

The invention claimed is:

1. A smart device that may perform multitasking control, the smart device comprising:
    an input unit receiving information according to a user's key or menu manipulation;
    a controller running an application according to the information received through the input unit; and
    a display unit receiving a control signal from the controller to display on a screen, wherein when a second application is executed after a first application, the controller displays a second application control screen to be overlaid on a first application running screen, splits the second application control screen into a first screen and a second screen, changes the first screen to be transparent overlaid on a first portion of the first application running screen, displays the second screen overlaid on a second portion of the first application running screen to display state information on the second application, and receives a first input signal through the first screen or the second screen to control the second application, and wherein the first screen is removable with the second screen remaining in display; after the first screen is removed:
  controls the first application when a second input signal is received through the first portion of the first application running screen; and
  controls the second application when the second input signal is received through the second screen.

2. The smart device of claim 1, wherein the second screen is displayed on an edge portion of the first application running screen, and an operation state is displayed in a color or in a light flickering form.

3. The smart device of claim 1, wherein the input signal is a touch or a sliding signal.

4. The smart device of claim 1, wherein when receiving a signal determined by a predetermined rule through the second application control screen, the controller removes the first screen or overlays the first screen back.

5. The smart device of claim 1, wherein when receiving a signal determined by a predetermined rule, the controller removes both the first screen and the second screen, and when a predetermined time elapses or when there is no input signal for a predetermined time, redisplays the first screen and the second screen.

6. The method of claim 1, wherein the state information on the second application includes text information.

7. The method of claim 1, wherein the controller controls the second application through the first screen with no non-transparent control button displayed on the first screen.

8. A method for controlling a smart device that may perform multitasking control, the method comprising:
  receiving a first input signal from an input unit to display a second application control screen corresponding to a second application to be overlaid on a first application miming screen corresponding to a first application;
  splitting the second application control screen into a first screen and a second screen;
  changing the first screen to be transparent and displaying the first screen overlaid on a first portion of the first application running screen, and displaying the second screen overlaid on a second portion of the first application running; screen to display state information on the second application;
  receiving a second input signal through the first screen or the second screen; and
  performing control of the second application through the first screen or the second screen according to the second input signal, wherein the first screen is removable with the second screen remaining in display;
  after removing the first screen:
    performing control of the first application, when receiving a third input signal through the first portion of the first application running screen; and
    performing control of the second application, when receiving the third input signal through the second screen.

9. The method of claim 8, wherein the second screen is displayed on an edge portion of the first application running screen, and an operation state is displayed in a color or in a light flickering form.

10. The method of claim 8, wherein the input signal is a touch or a sliding signal.

11. The method of claim 8, wherein when receiving a signal determined by a predetermined rule through the second application control screen, the first screen is removed or overlaid back.

12. The method of claim 8, wherein performing the control is, when receiving a signal determined by a predetermined rule, removing both the first screen and the second screen, and when a predetermined time elapses or when there is no input signal for a predetermined time, redisplaying the first screen and the second screen.

* * * * *